US011539752B2

(12) United States Patent
Keiter et al.

(10) Patent No.: US 11,539,752 B2
(45) Date of Patent: Dec. 27, 2022

(54) SELECTIVE SECURITY REGULATION FOR NETWORK COMMUNICATION

(71) Applicant: BANK OF AMERICA CORPORATION, Charlotte, NC (US)

(72) Inventors: Kelly Renee-Drop Keiter, Waxhaw, NC (US); Christopher Daniel Birch, Dayton, OH (US); Susan R. Hart, Addison, TX (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 327 days.

(21) Appl. No.: 16/860,832

(22) Filed: Apr. 28, 2020

(65) Prior Publication Data

US 2021/0336993 A1    Oct. 28, 2021

(51) Int. Cl.
| | |
|---|---|
| *G06F 21/00* | (2013.01) |
| *H04L 9/40* | (2022.01) |
| *G06Q 50/26* | (2012.01) |
| *G06Q 40/02* | (2012.01) |
| *G06F 8/65* | (2018.01) |

(52) U.S. Cl.
CPC ............ *H04L 63/20* (2013.01); *G06F 8/65* (2013.01); *G06Q 40/02* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 7,412,412 B2 | 8/2008 | Buxton et al. | |
| 7,814,004 B2 | 10/2010 | Haggerty et al. | |
| 7,814,008 B2 | 10/2010 | Choudhuri et al. | |
| 7,831,494 B2 | 11/2010 | Sloan et al. | |
| 7,873,566 B1 | 1/2011 | Templeton et al. | |
| 7,912,770 B2 | 3/2011 | Haggerty et al. | |
| 7,991,690 B2 | 8/2011 | Choudhuri et al. | |
| 8,315,942 B2 | 11/2012 | Haggerty et al. | |
| 8,438,105 B2 | 5/2013 | Haggerty et al. | |
| 8,630,905 B2 * | 1/2014 | Fisher | G06Q 20/3226 705/16 |
| 8,831,972 B2 | 9/2014 | Angell et al. | |
| 8,931,043 B2 * | 1/2015 | Cooper | G06F 21/552 709/224 |
| 9,973,534 B2 * | 5/2018 | Mahaffey | H04W 12/086 |
| 10,755,314 B2 * | 8/2020 | Rudrappa | G06Q 30/0269 |

(Continued)

*Primary Examiner* — Maung T Lwin
(74) *Attorney, Agent, or Firm* — Moore & Van Allen PLLC; Nicholas C. Russell (57) ABSTRACT

Embodiments of the present invention provide a system for providing selective security regulations associated with network communications to users. The system is configured for extracting user data associated with a user, identifying one or more characteristics based on the extracted user data, generating a custom security package for the user based on the one or more characteristics, displaying one or more options associated with the custom security package on a user device of the user, prompting the user to select at least one option from the one or more options, receiving the at least one option from the user, and deploying a functionality associated with the at least one option from the custom security package.

20 Claims, 6 Drawing Sheets

(56) References Cited

U.S. PATENT DOCUMENTS

| | | | |
|---|---|---|---|
| 2003/0105697 A1* | 6/2003 | Griffin | G06Q 40/02 |
| | | | 705/36 R |
| 2004/0123154 A1* | 6/2004 | Lippman | H04L 63/102 |
| | | | 709/229 |
| 2007/0180490 A1* | 8/2007 | Renzi | G06F 21/604 |
| | | | 726/1 |
| 2009/0089107 A1 | 4/2009 | Angell et al. | |
| 2010/0263021 A1* | 10/2010 | Arnott | H04L 69/24 |
| | | | 726/1 |
| 2011/0078073 A1 | 3/2011 | Annappindi | |
| 2012/0117608 A1* | 5/2012 | Metke | H04L 63/0823 |
| | | | 726/1 |
| 2013/0081099 A1* | 3/2013 | Sathish | G06F 21/6245 |
| | | | 726/1 |
| 2015/0026039 A1 | 1/2015 | Annappindi | |
| 2016/0132890 A1* | 5/2016 | Banerjee | G06Q 20/4014 |
| | | | 705/44 |
| 2016/0239831 A1 | 8/2016 | Saunders | |
| 2017/0012981 A1* | 1/2017 | Obaidi | H04L 63/20 |
| 2017/0272472 A1* | 9/2017 | Adhar | G06F 21/602 |
| 2017/0353459 A1* | 12/2017 | Lawrence | H04L 63/0263 |
| 2018/0060954 A1* | 3/2018 | Yin | G06Q 40/025 |
| 2019/0213509 A1* | 7/2019 | Burleson | G06N 20/00 |

* cited by examiner

SELECTIVE SECURITY REGULATION FOR NETWORK COMMUNICATION

BACKGROUND

Conventional systems do not have the capability to provide selective security regulations to users. As such, there exists a need for a system that provides selective security regulations associated with network communications to users.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing selective security regulations associated with network communications to users. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts user data associated with a user, identifies one or more characteristics based on the extracted user data, generates a custom security package for the user based on the one or more characteristics, displays one or more options associated with the custom security package on a user device of the user, prompts the user to select at least one option from the one or more options, receives the at least one option from the user; and deploys a functionality associated with the at least one option from the custom security package.

In some embodiments, the present invention deploys the functionality based on generating a selective security package comprising the functionality associated with the at least option selected by the user and transferring the selective security package to the user device of the user.

In some embodiments, the present invention transfers the selective security package to one or more entity systems associated with handling network communications of the user.

In some embodiments, the present invention identifies a network communication initiated by the user, determines a type of the network communication, identifies that the type of the network communication matches with a predetermined type of network communication, and causes the selective security package to trigger an action.

In some embodiments, triggering the action comprises generating and transmitting a notification associated with the network communication.

In some embodiments, triggering the action comprises initiating additional authentication for completing the network communication.

In some embodiments, triggering the action comprises deferring completion of the network communication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by an entity or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

In some embodiments, an "entity" as used herein may include any financial institutions such as commercial banks, thrifts, federal and state savings banks, savings and loan associations, credit unions, investment companies, insurance companies and the like. In some embodiments, the financial institution may allow a customer to establish an account with the financial institution. As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

Figure 1:
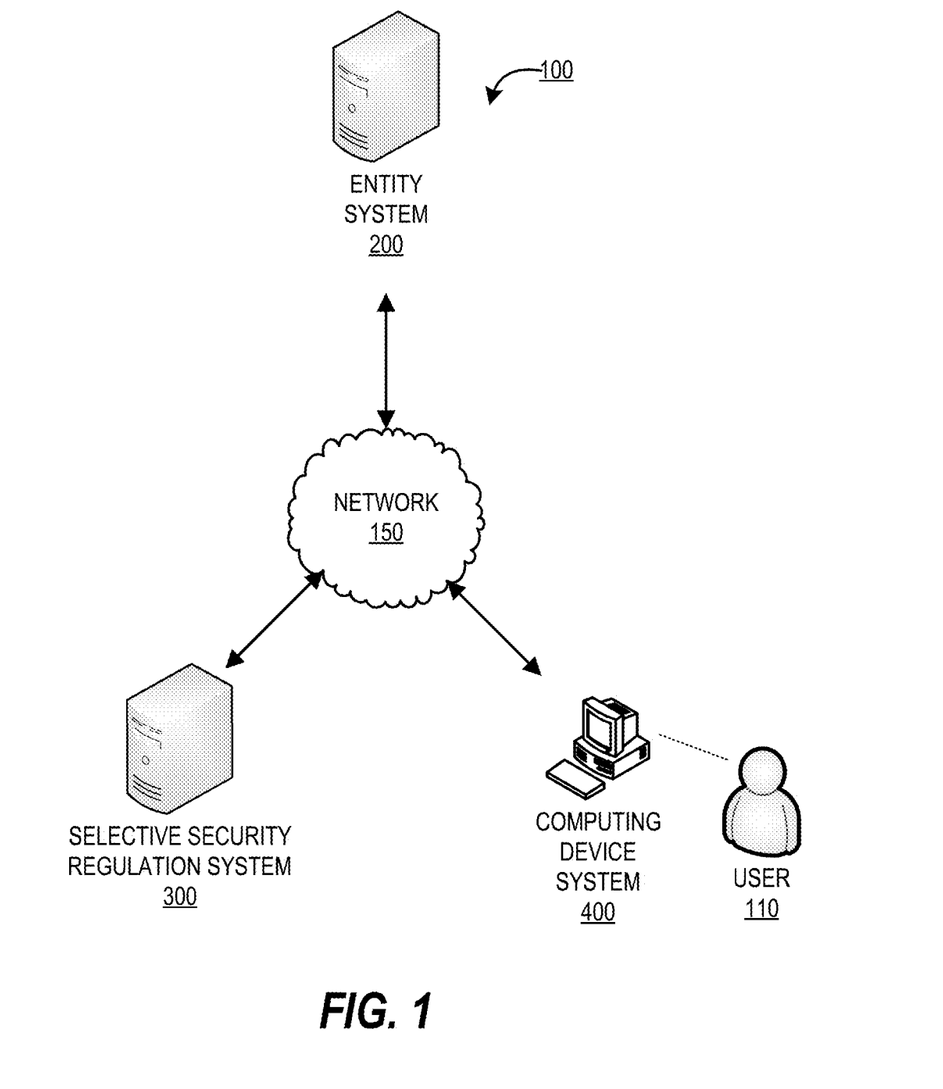
FIG. 1 provides a block diagram illustrating a system environment for providing selective security regulations associated with network communications to users, in accordance with an embodiment of the invention.

FIG. 1 provides a block diagram illustrating a system environment 100 for providing selective security regulations associated with network communications to users, in accordance with an embodiment of the invention. As illustrated in FIG. 1, the environment 100 includes a selective security regulation system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the entity may be any institutions that facilitates network communications of the user. As described herein, a network communication may be a transaction initiated by the user. For example, a user may have an account with the entity, where the user may perform one or more transactions using the resources in the account.

The entity system(s) 200 may be any system owned or otherwise controlled by an entity to support or perform one or more process steps described herein. In some embodiments, the entity is a financial institution. In such an embodiment, the one or more user(s) 110 may be customers that hold an account with the financial institution, where the financial institution maintain resources (funds) associated with the accounts of the users 110. In some embodiments, the entity may be an organization that facilitates resource transactions of a user.

The selective security regulation system 300 is a system of the present invention for performing one or more process steps described herein. In some embodiments, the selective security regulation system 300 may be an independent system. In some embodiments, the selective security regulation system 300 may be a part of the entity system 200.

The selective security regulation system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the selective security regulation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the selective security regulation system 300, and/or entity system 200 across the network 150.

Figure 2:
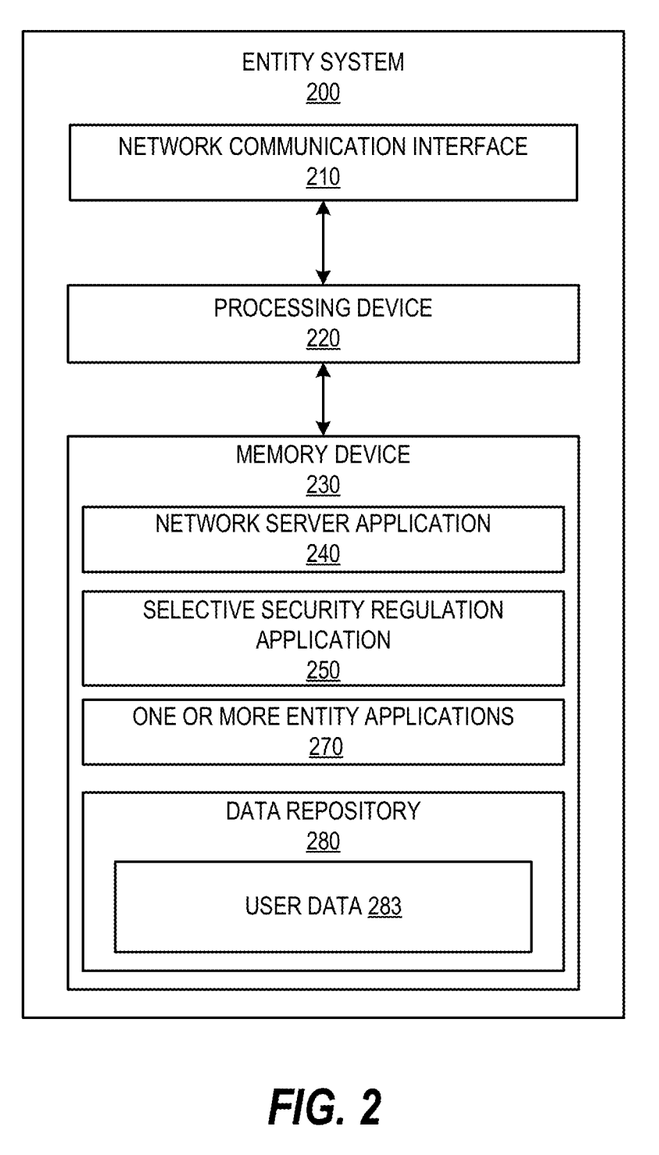
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a selective security regulation application 250, one or more entity applications 270, and a data repository 280 comprising information associated with user data 283. User data 283 may comprise personal data, transaction data, account data, and/or the like. The computer-executable program code of the network server application 240, the selective security regulation application 250, the one or more entity application 270 to perform certain logic, data-extraction, and data-storing functions of the entity system 200 described herein, as well as communication functions of the entity system 200.

The network server application 240, the selective security regulation application 250, and the one or more entity applications 270 are configured to store data in the data repository 280 or to use the data stored in the data repository 280 when communicating through the network communication interface 210 with the selective security regulation system 300, and/or the computing device system 400 to perform one or more process steps described herein. In some embodiments, the entity system 200 may receive instructions from the selective security regulation system 300 via the selective security regulation application 250 to perform certain operations. The selective security regulation application 250 may be provided by the selective security regulation system 300. The one or more entity applications 270 may be any of the applications used, created, modified, facilitated, and/or managed by the entity system 200.

Figure 3:
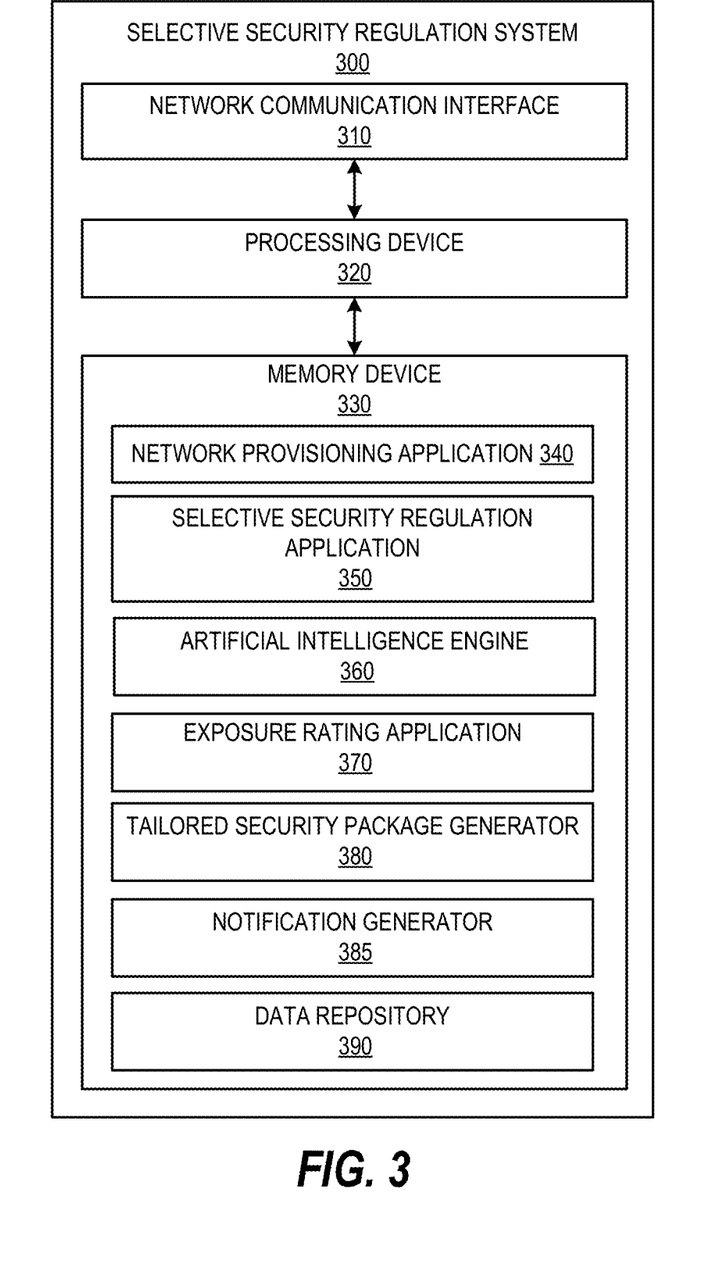
FIG. 3 provides a block diagram illustrating a selective security regulation system 300 of FIG. 1, in accordance with an embodiment of the invention.

FIG. 3 provides a block diagram illustrating the selective security regulation system 300 in greater detail, in accordance with embodiments of the invention. As illustrated in FIG. 3, in one embodiment of the invention, the selective security regulation system 300 includes one or more processing devices 320 operatively coupled to a network communication interface 310 and a memory device 330. In certain embodiments, the selective security regulation system 300 is operated by an entity, such as a financial institution. In some embodiments, the selective security regulation system 300 is owned or operated by the entity of the entity system 200. In some embodiments, the selective security regulation system 300 may be an independent system. In alternate embodiments, the selective security regulation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the selective security regulation system 300 described herein. For example, in one embodiment of the selective security regulation system 300, the memory device 330 includes, but is not limited to, a network provisioning application 340, a selective security regulation application 350, an artificial intelligence engine 360, a exposure rating application 370, a tailored security package generator 380, a notification generator 385, and a data repository 390 comprising data processed or accessed by one or more applications in the memory device 330. The computer-executable program code of the network provisioning application 340, the selective security regulation application 350, the artificial intelligence engine 360, the exposure rating application 370, the tailored security package generator 380, and the notification generator 385 may instruct the processing device 320 to perform certain logic, data-processing, and data-storing functions of the selective security regulation system 300 described herein, as well as communication functions of the selective security regulation system 300.

The network provisioning application 340, the selective security regulation application 350, the artificial intelligence engine 360, the exposure rating application 370, the tailored security package generator 380, and the notification generator 385 are configured to invoke or use the data in the data repository 390 when communicating through the network communication interface 310 with the entity system 200, and/or the computing device system 400. In some embodiments, the network provisioning application 340, the selective security regulation application 350, the artificial intelligence engine 360, the exposure rating application 370, the tailored security package generator 380, and the notification generator 385 may store the data extracted or received from the entity system 200, and the computing device system 400 in the data repository 390. In some embodiments, the network provisioning application 340, the selective security regulation application 350, the artificial intelligence engine 360, the exposure rating application 370, the tailored security package generator 380, and the notification generator 385 may be a part of a single application.

Figure 4:
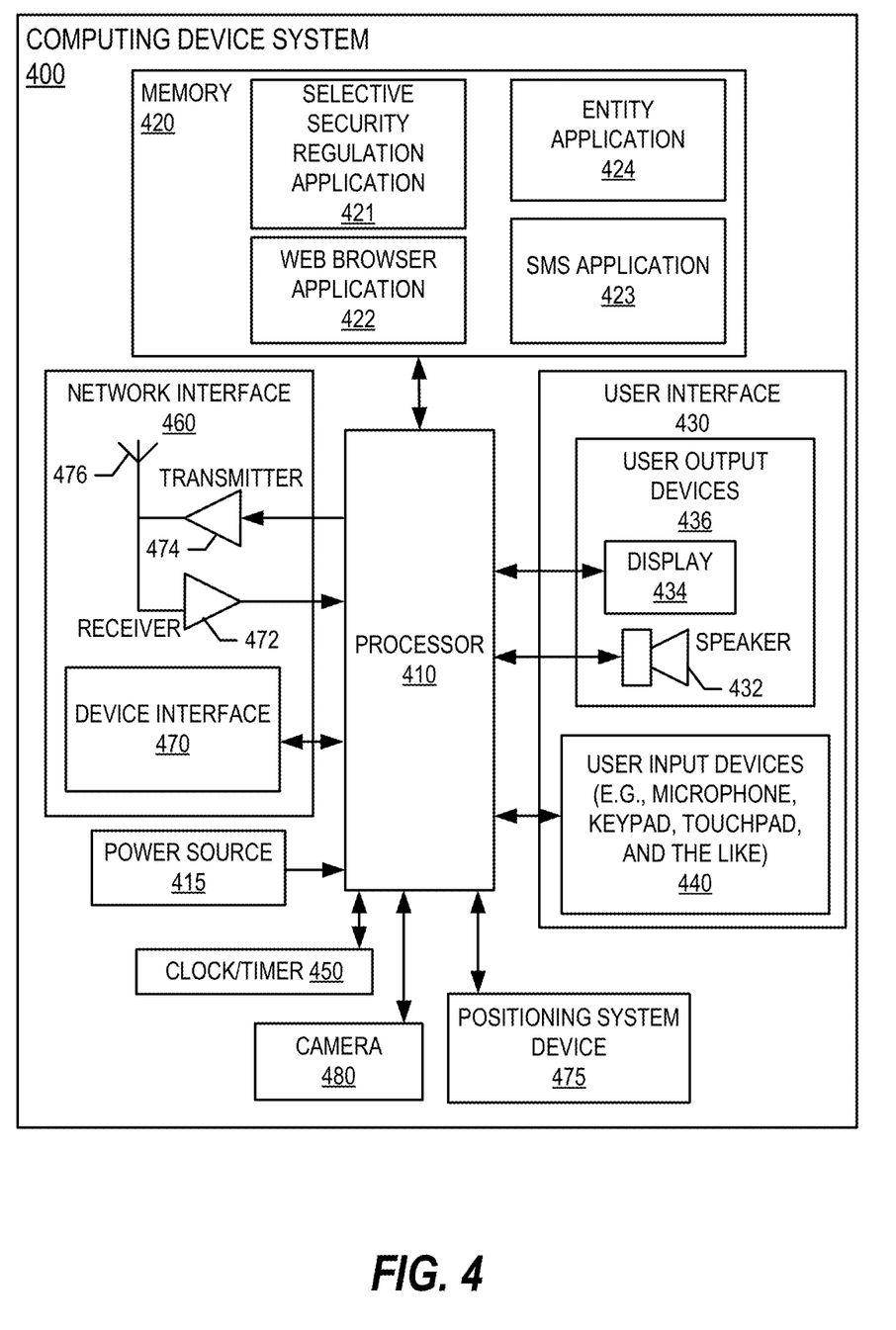
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a selective security regulation application 421, entity application 424. These applications also typically instructions to a graphical user interface (GUI) on the display 430 that allows the user 110 to interact with the entity system 200, the selective security regulation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the selective security regulation application 421 provided by the selective security regulation system 300 allows the user 110 to access the selective security regulation system 300. In some embodiments, the entity application 424 provided by the entity system 200 and the selective security regulation application 421 allow the user 110 to access the functionalities provided by the selective security regulation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
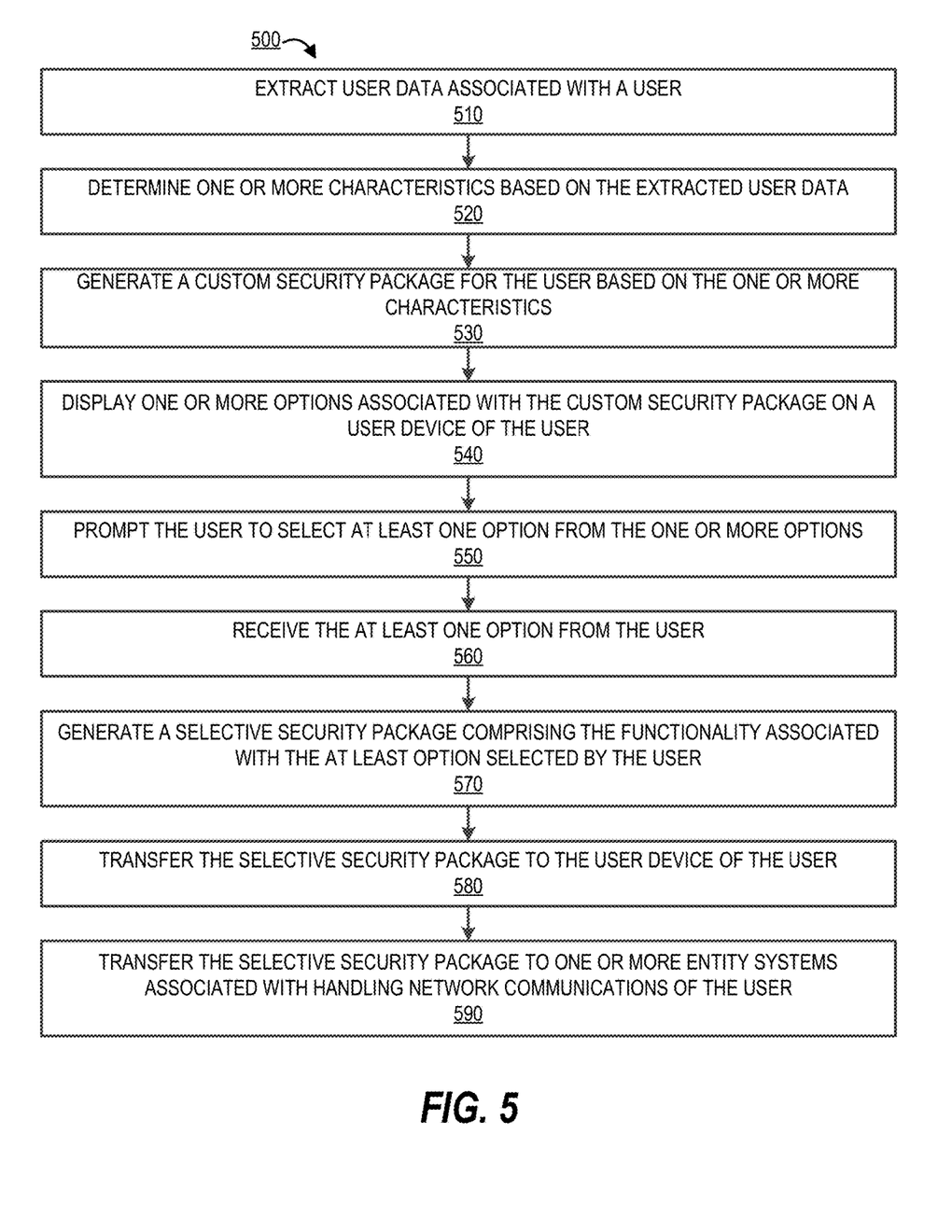
FIG. 5 provides a flowchart illustrating a process flow for providing selective security regulations associated with network communications to users, in accordance with an embodiment of the invention.

FIG. 5 provides a flowchart illustrating a process flow for providing selective security regulations associated with network communications to users, in accordance with an embodiment of the invention.

As shown in block 510, the system extracts user data associated with a user. The user data may be stored in the data repository of the entity system. The user data comprises at least personal information, account information, transaction information, and/or the like. The transaction information may comprise transaction amount, transaction date, merchant name, merchant device data, user device data, and/or the like.

As shown in block 520, the system determines one or more characteristics based on the extracted user data. The one or more characteristics comprise exposure rating associated with a user. For example, the system may determine based on the transaction data that the user performs transactions only with well-known merchants that do not have historical exposures (e.g., security related events) and may determine that the user has low exposure characteristics. The system based on determining that the user has low exposure characteristics the system may assign a low exposure rating to the user. In another example, the system may identify that the user has performed more than one transaction with unknown merchants that resulted in misappropriation events (e.g., misappropriation of account, credit card information, or the like) associated with the account of the user, the system may determine that the user has high exposure characteristics. In some embodiments, the system may utilize confidence scores of the one or more merchants that are associated with the transactions of the user to determine the exposure rating of the user. In another example, the system may identify that the user performs transactions frequently at a location that is associated with high malfeasance percentage and may determine that the user has high exposure characteristics. In yet another example, the system may identify that the user performs transactions at a certain time of the day (e.g., after midnight) and may determine that the user has high exposure characteristics. In yet another example, the system may identify that the user perform transactions that are associated with high transaction amounts and may determine that the user has high exposure characteristics. In some embodiments, the system may use any combination of the logics described in the above examples to determine the one or more characteristics of the user based on the extracted user data. In some embodiments, the system may also create patterns of transactions associated with the user and may store the patterns of transactions in the data repository.

As shown in block 530, the system generates a custom security package for the user based on the one or more characteristics. The generated custom security package may be based on the one or more characteristics determined by the system in block 520. The generated custom security package comprises one or more security measures or regulations. In some embodiments, the system may generate a custom security package with low level security measures based on determining that the user has low exposure characteristics. In some embodiments, the system may generate a custom security package with high level security measures based on determining that the user has high exposure characteristics. In some embodiments, the custom security package generated by the system comprises one or more software codes that implements one or more functionalities associated with the security measures. For example, the generated custom security package may comprise a software code that triggers and implements additional layer of authentication for transactions that are categorized as high level exposure transactions. In some embodiments, the system may generate a medium level security package based on determining that the user has medium exposure characteristics.

As shown in block 540, the system displays one or more options associated with the custom security package on a user device of the user. The one or more options may be associated with the security measures in the custom security package generated by the system. As shown in block 550, the system prompts the user to select at least one option from the one or more options. As shown in block 560, the system receives the at least one option from the user. For example, the system may present a first option comprising generation of notifications, a second option comprising generation of additional layer of authentication before completing the transaction, and a third option comprising delaying the completion of transaction until verification of the authenticity of the transaction is complete. Upon displaying the one or more options, the user may choose first option, second option, and/or the third option. It should be understood that the examples presented herein are for illustrative purposes only. The custom security package generated in real-time may comprise complicated security measures including but not limited to high level manipulation of data (e.g., using cryptography) and the like.

As shown in block 570, the system generates a selective security package comprising the functionality associated with the at least option selected by the user. In some embodiments, the system may generate the selective security package based on deleting the security measures/functionalities that are not chosen by the user from the custom security package generated by the system in block 530. In some embodiments, the system may generate the selective security package based on activating the options selected by the user and keeping the other options as inactive in the custom security package. In such an embodiment, the inactive options may be automatically implemented by the system at a later time period based on identifying changes to the one or more characteristics of the user. For example, the system may identify that the exposure rating of a user has increased and may further identify that the user has chosen only one option out of the multiple options presented by the system. In such an instance, the system may automatically activate the other options not selected by the user.

As shown in block 580, the system transfers the selective security package to the user device of the user. In some embodiments, the user may perform transactions via the user device (e.g., digital wallet). In such an embodiment, the system deploys the selective security package to the user device which will allow the system to trigger functionalities via the selective security regulation application present in the user device.

As shown in block 590, the system transfers the selective security package to one or more entity systems associated with handling network communications of the user. In some embodiments, the user may perform transactions via a merchant system (e.g., Point of Sale device or merchant website) and resource cards (e.g., credit card, debit card, or the like). In such an embodiment, the transaction goes through the entity system (e.g., financial institution system that verifies the presence of funds in the account of the user). The system transfers the selective security package to the entity system which will allow the system to trigger functionalities associated with the selective security package via the selective security regulation application present in the entity system.

Figure 6:
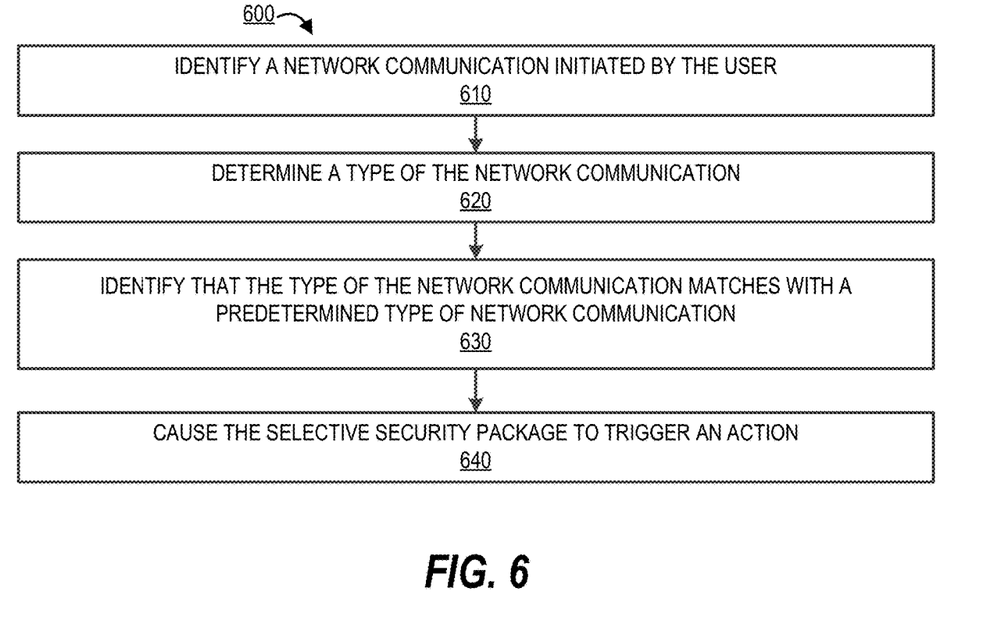
FIG. 6 provides a flowchart illustrating a process flow for implementing the selective security regulations associated with network communications, in accordance with an embodiment of the invention.

FIG. 6 provides a flowchart illustrating a process flow for implementing the selective security regulations associated with network communications, in accordance with an embodiment of the invention.

As shown in block 610, the system identifies a network communication initiated by the user. The network communication may be a transaction initiated by the user using the user device or resource cards (e.g., credit card). In some embodiments, the system identifies the initiation of the transaction via the selective security regulation application present in the user device. For example, the system may identify that the user is using digital wallet to initiate a transaction via the selective security regulation application. In some embodiments, the system identifies the initiation of the transaction via the selective security regulation application present in the entity system. For example, the system may identify that the user has initiated a transaction via a resource card based on a verification request received by the entity system from a third party transaction system via the selective security regulation application present in the entity system.

As shown in block 620, the system determines a type of the network communication. The system may determine the type of network communication based on one or more factors. The one or more factor may comprise time of the day, transaction amount, merchant name, merchant location, merchant web site in the case of an online transaction, or the like. For example, the system may identify that the transaction is a high exposure transaction based on determining that the transaction amount is above a predetermine threshold. In another example, the system may identify that the transaction is a high exposure transaction based on determining that the location at which the transaction was initiated is associated with a high malfeasance percentage.

As shown in block 630, the system identifies that the type of the network communication matches with a predetermined type of network communication. The predetermined type of network communication may comprise a high exposure or medium exposure transaction.

As shown in block 640, the system causes the selective security package to trigger an action in response to identifying that the type of the network communication matches with a predetermined type of network communication. The actions may comprise functionalities associated with the options selected by the user. Actions may comprise at least one of generation of notifications, generation of additional layer of authentication, delaying the completion of transaction until verification of the authenticity of the transaction is complete, or the like. In some embodiments, the process flow described herein may be applicable for making changes to any account data, personal data, or the like. For example, if a request is initiated at an odd time of the day, where the request if associated with change of phone number associated with an account, the process flow described herein may be used to implement one or more security regulations.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent application:

| Docket Number | U.S. patent application Ser. No. | Title | Filed On |
|---|---|---|---|
| 9764US1.014033.3722 | 16/860,900 | SYSTEM FOR RESOURCE USAGE MONITORING WITH ACTIVITY SCORING | Concurrently herewith |

The invention claimed is:

1. A system for providing selective security regulations associated with network communications to users, the system comprising:
at least one network communication interface;
at least one non-transitory storage device; and
at least one processing device coupled to the at least one non-transitory storage device and the at least one network communication interface, wherein the at least one processing device is configured to:
extract user data associated with a user of the users;
determine one or more characteristics based on the extracted user data;
generate a custom security package for the user based on the one or more characteristics;
display a plurality of options associated with the custom security package on a user device of the user, wherein the plurality of options are associated with a plurality of security measures;
prompt the user to select at least one option from the plurality of options;
receive the at least one option from the user device of the user; and
deploy a functionality associated with the at least one option from the custom security package, wherein the custom security package comprises a plurality of functionalities associated with the plurality of options, wherein the custom security package comprises a set of software codes to implement the functionality.

2. The system of claim 1, wherein the at least one processing device is configured to deploy the functionality based on:
deleting the plurality of functionalities associated with the plurality of options excluding the functionality associated with the at least one option from the custom security package to generate a selective security package comprising the functionality associated with the at least option selected by the user; and
transferring the selective security package to the user device of the user.

3. The system of claim 2, wherein the at least one processing device is configured to transfer the selective security package to one or more entity systems associated with handling network communications of the user.

4. The system of claim 3, wherein the at least one processing device is configured to:
identify a network communication of the network communications initiated by the user;
determine a type of the network communication;
identify that the type of the network communication matches with a predetermined type of network communication; and
cause the selective security package to trigger an action.

5. The system of claim 4, wherein triggering the action comprises generating and transmitting a notification associated with the network communication.

6. The system of claim 4, wherein triggering the action comprises initiating authentication for completing the network communication.

7. The system of claim 4, wherein triggering the action comprises deferring completion of the network communication.

8. A computer program product for providing selective security regulations associated with network communications to users, the computer program product comprising a non-transitory computer-readable storage medium having computer executable instructions for causing a computer processor to perform the steps of:
extracting user data associated with a user of the users;
determining one or more characteristics based on the extracted user data;
generating a custom security package for the user based on the one or more characteristics;
displaying a plurality of options associated with the custom security package on a user device of the user, wherein the plurality of options are associated with a plurality of security measures;
prompting the user to select at least one option from the plurality of options;
receiving the at least one option from the user device of the user; and
deploying a functionality associated with the at least one option from the custom security package, wherein the custom security package comprises a plurality of functionalities associated with the plurality of options, wherein the custom security package comprises a set of software codes to implement the functionality.

9. The computer program product of claim 8, wherein the computer executable instructions cause the computer processor to perform the steps of deploying the functionality based on:
deleting the plurality of functionalities associated with the plurality of options excluding the functionality associated with the at least one option from the custom security package to generate a selective security package comprising the functionality associated with the at least option selected by the user; and
transferring the selective security package to the user device of the user.

10. The computer program product of claim 9, wherein the computer executable instructions cause the computer processor to perform the steps of transferring the selective security package to one or more entity systems associated with handling network communications of the user.

11. The computer program product of claim 10, wherein the computer executable instructions cause the computer processor to perform the steps of:
identifying a network communication of the network communications initiated by the user;

determining a type of the network communication;

identifying that the type of the network communication matches with a predetermined type of network communication; and causing the selective security package to trigger an action.

12. The computer program product of claim 11, wherein triggering the action comprises generating and transmitting a notification associated with the network communication.

13. The computer program product of claim 11, wherein triggering the action comprises initiating authentication for completing the network communication.

14. The computer program product of claim 11, wherein triggering the action comprises deferring completion of the network communication.

15. A computer implemented method for providing selective security regulations associated with network communications to users, wherein the method comprises:

extracting user data associated with a user of the users;

determining one or more characteristics based on the extracted user data;

generating a custom security package for the user based on the one or more characteristics;

displaying plurality of options associated with the custom security package on a user device of the user, wherein the plurality of options are associated with a plurality of security measures;

prompting the user to select at least one option from the plurality of options;

receiving the at least one option from the user device of the user; and deploying a functionality associated with the at least one option from the custom security package, wherein the custom security package comprises a plurality of functionalities associated with the plurality of options, wherein the custom security package comprises a set of software codes to implement the functionality.

16. The computer implemented method of claim 15, wherein deploying the functionality comprises:

deleting the plurality of functionalities associated with the plurality of options excluding the functionality associated with the at least one option from the custom security package to generate a selective security package comprising the functionality associated with the at least option selected by the user; and transferring the selective security package to the user device of the user.

17. The computer implemented method of claim 16, wherein the method further comprises transferring the selective security package to one or more entity systems associated with handling network communications of the user.

18. The computer implemented method of claim 17, wherein the method further comprises:

identifying a network communication of the network communications initiated by the user;

determining a type of the network communication;

identifying that the type of the network communication matches with a predetermined type of network communication; and causing the selective security package to trigger an action.

19. The computer implemented method of claim 18, wherein triggering the action comprises generating and transmitting a notification associated with the network communication.

20. The computer implemented method of claim 18, wherein triggering the action comprises deferring completion of the network communication.

\* \* \* \* \*